Figure 1:
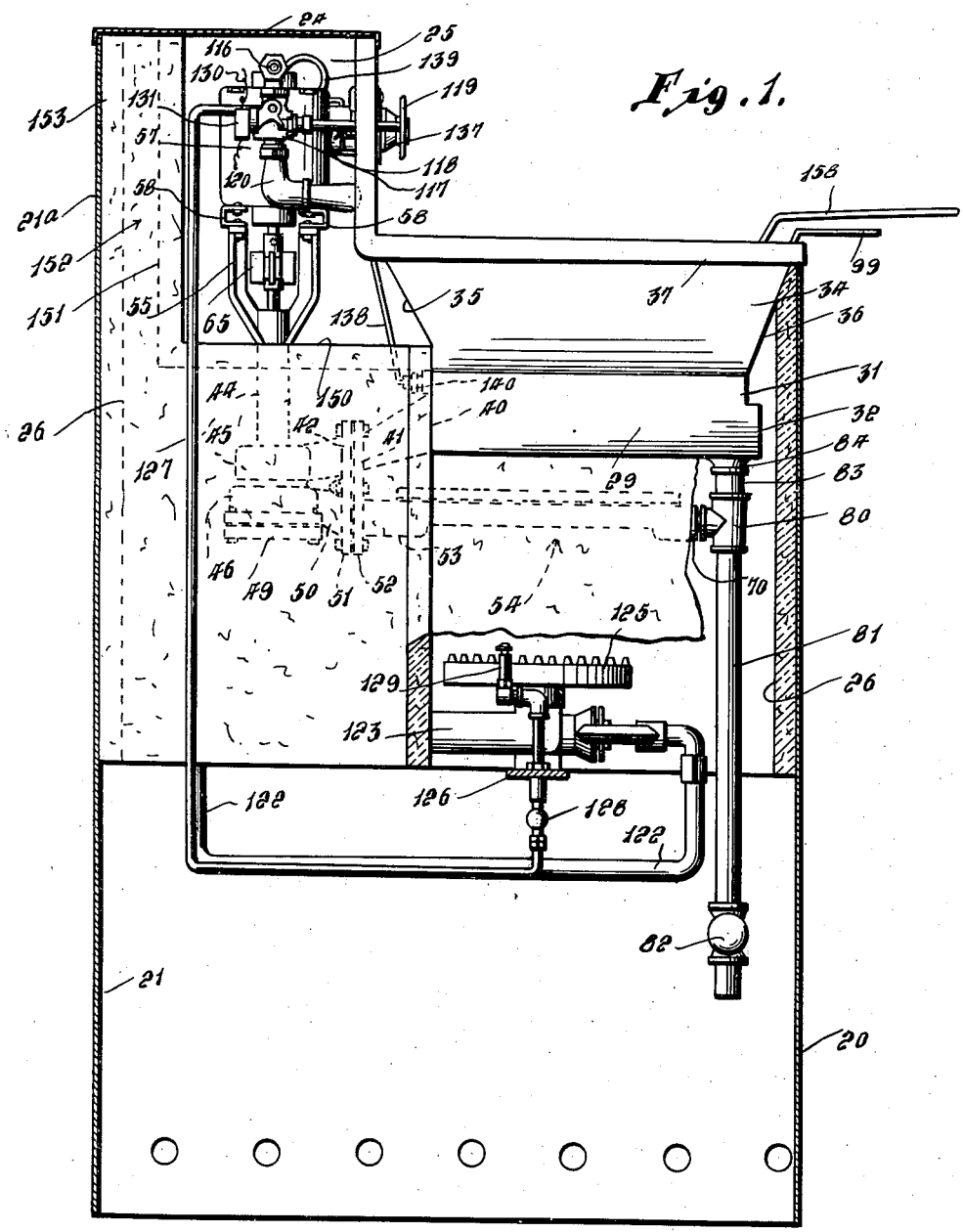

May 27, 1941.　　　　K. P. TOTA　　　　2,243,661
DEEP FAT FOOD FRYER
Filed July 30, 1940　　　　9 Sheets-Sheet 1

Inventor
Kenneth P. Tota
By F. K. Bryant
Attorney.

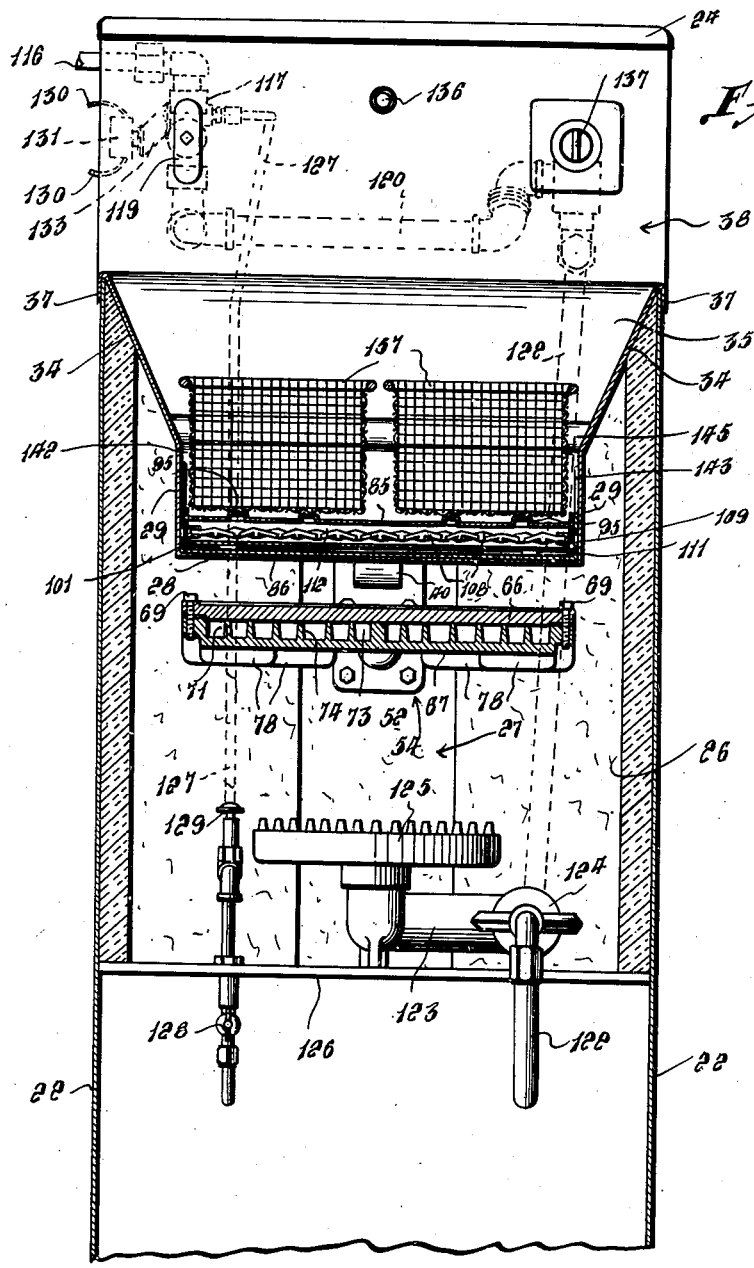

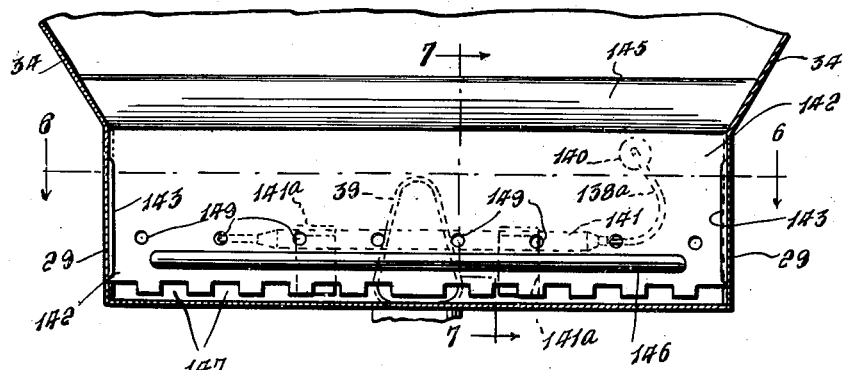
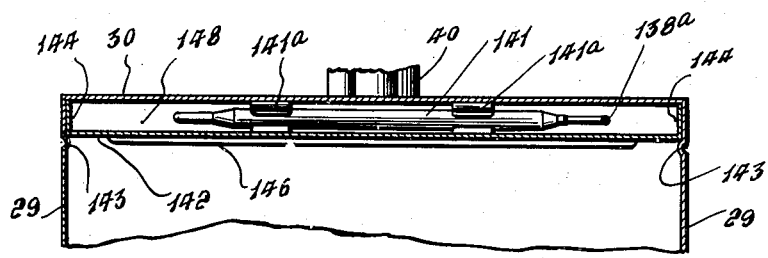
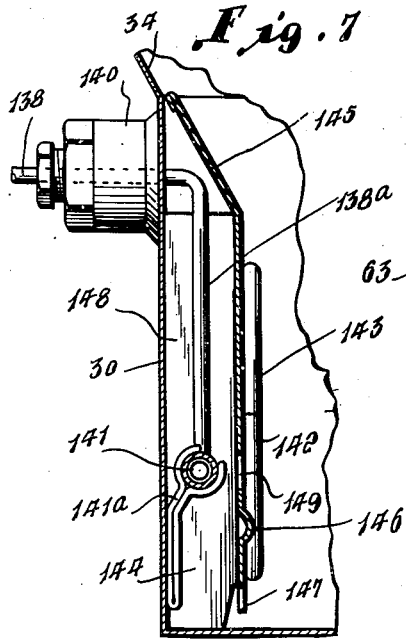
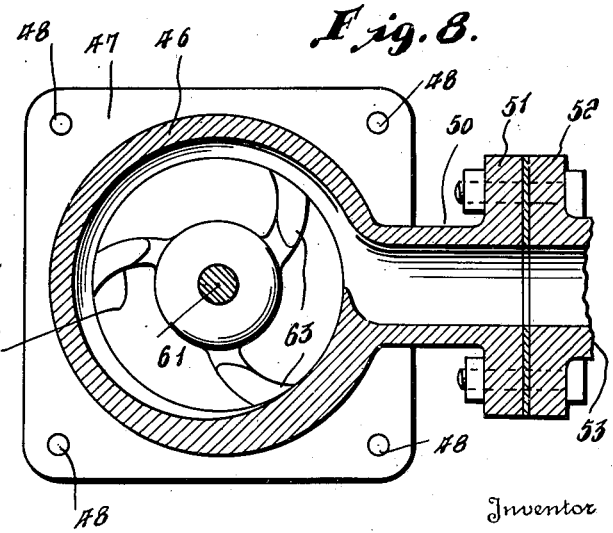

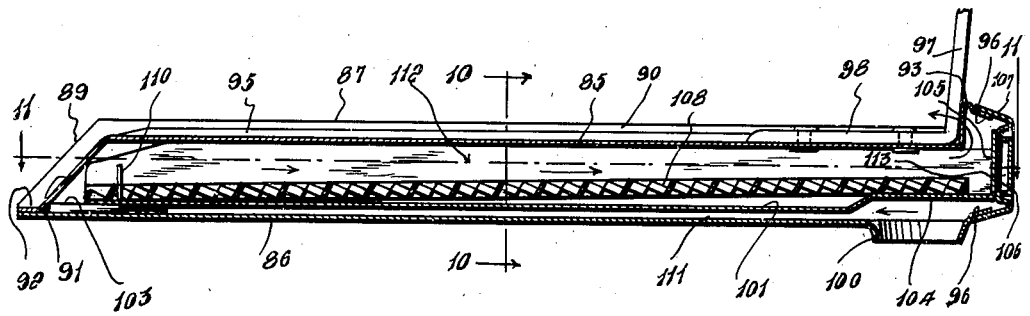
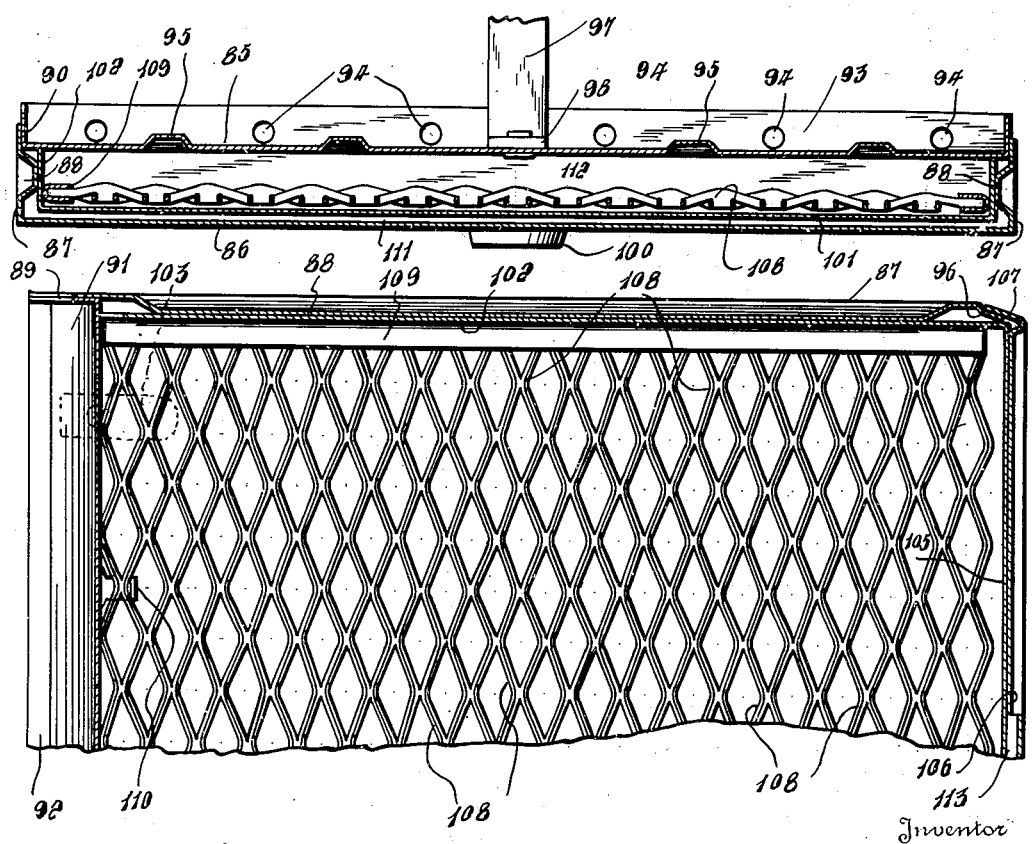

May 27, 1941. K. P. TOTA 2,243,661
DEEP FAT FOOD FRYER
Filed July 30, 1940 9 Sheets-Sheet 7
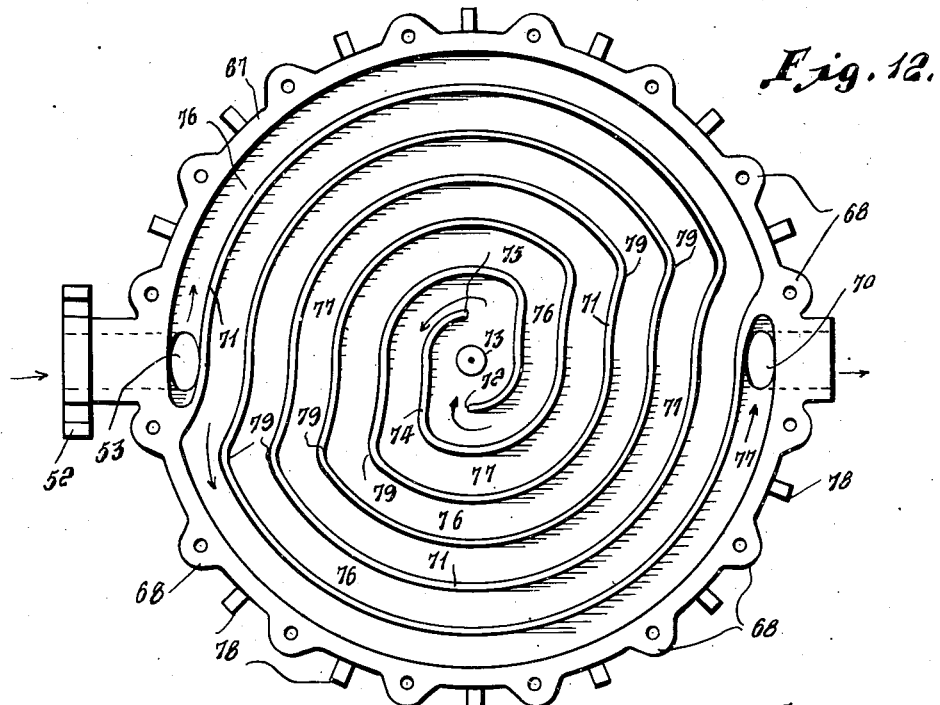
Fig. 12.
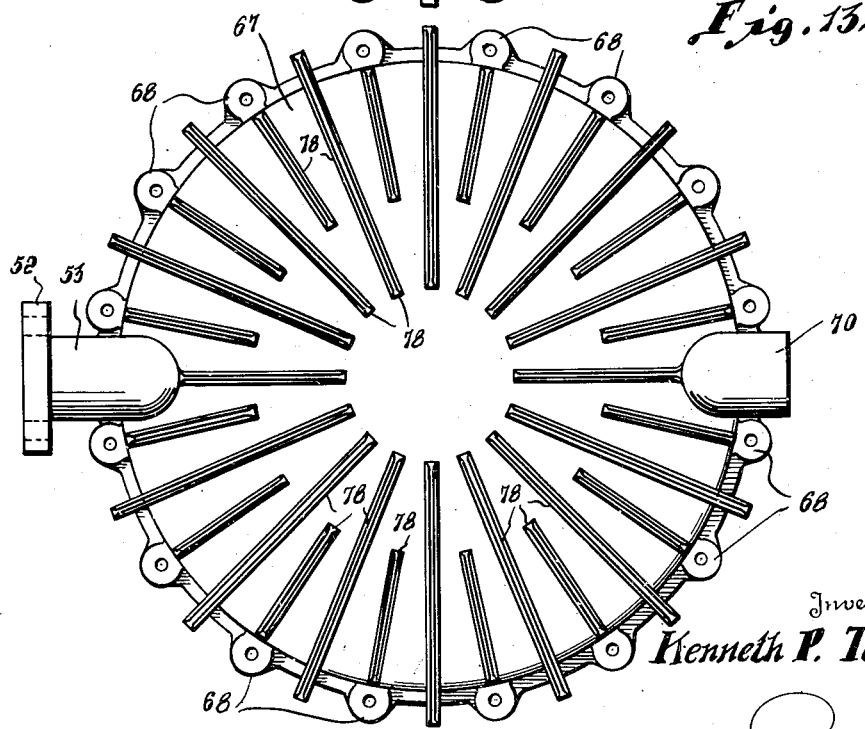
Fig. 13.
Inventor
Kenneth P. Tota
By
Attorney May 27, 1941.  K. P. TOTA  2,243,661
DEEP FAT FOOD FRYER
Filed July 30, 1940  9 Sheets-Sheet 8

Inventor
Kenneth P. Tota

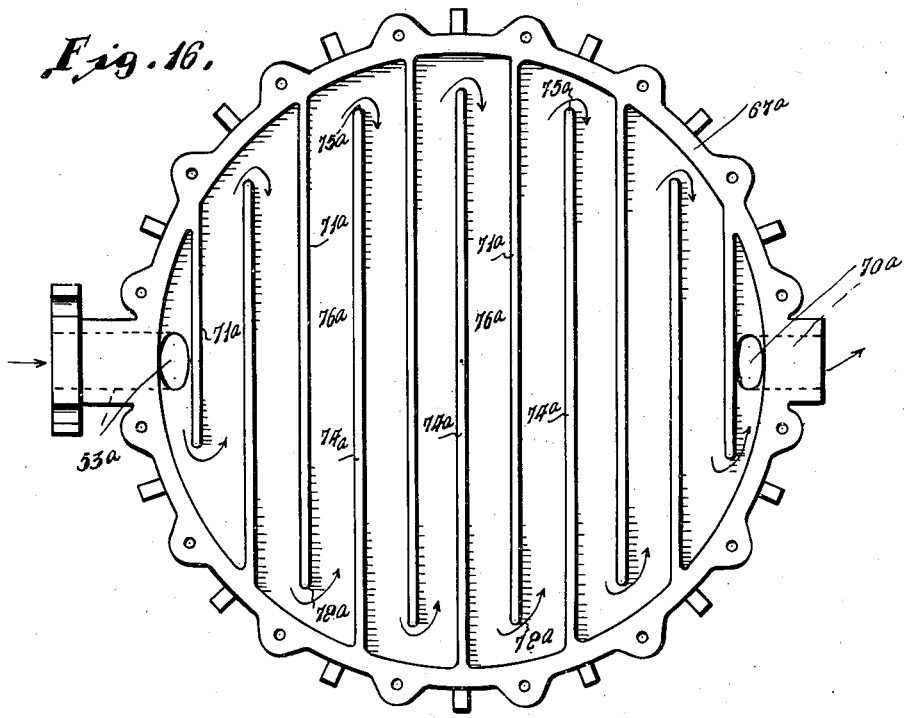
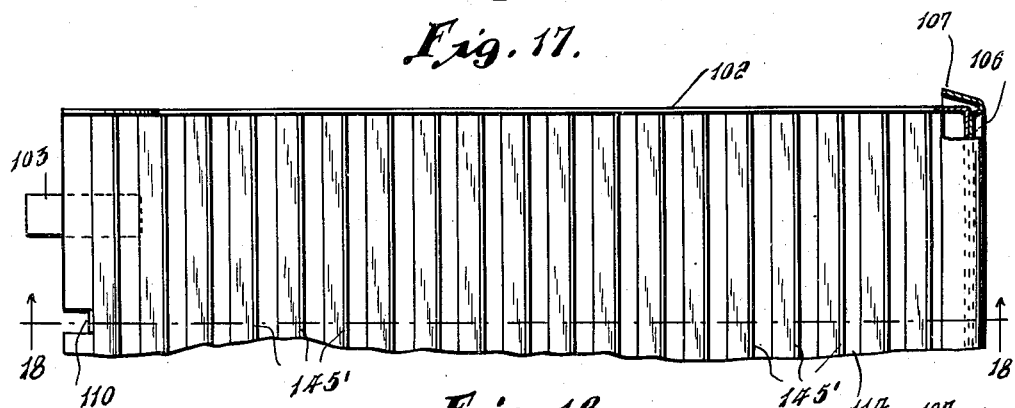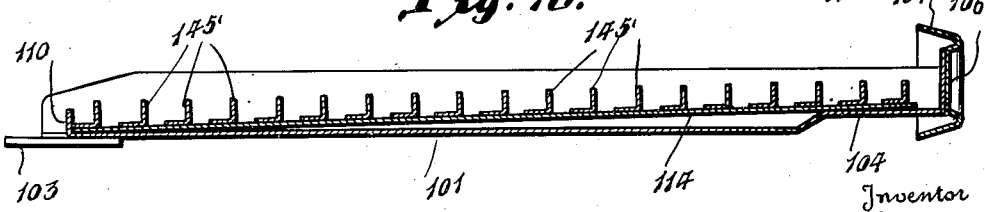

Patented May 27, 1941

2,243,661

UNITED STATES PATENT OFFICE 2,243,661

DEEP FAT FOOD FRYER

Kenneth P. Tota, Elmira, N. Y., assignor to Ken-Vic, Inc., Elmira, N. Y., a corporation of New York Application July 30, 1940, Serial No. 348,567

20 Claims. (Cl. 53—7)

This invention relates to certain new and useful improvements in deep fat food fryers of the type disclosed in the application for patent of Kenneth P. Tota filed on June 20, 1939, Serial No. 280,198, which issued on Aug. 27, 1940, as Patent No. 2,212,905, and embodies numerous improvements in the art thereover.

An object of the present invention is to provide a deep fat food fryer wherein a combination filter and distributor for the fat is removably mounted upon the bottom wall of a vat with means for forcing the fat through the filter and distributor in a cycle of operation away from and to the vat so that the fat in its highest heated state is returned to the vat for the deep fat food frying of food placed in the vat.

A further object of the invention is to provide a deep fat food fryer of the foregoing character embodying a cooking vat, a fat-heating element disposed below the vat and a pump for drawing fat from the vat and delivering the same to the fat-heating element for return to the vat and wherein the vat, pump and fat-heating element are constructed to promote the complete evaporation into steam of all entrained water globules flowing with the fat and discharged into the fat by the food being fried.

A still further object of the invention is to provide a deep fat food fryer including a frying vat, a fat-heating element and a pump forming communication between the vat and fat-heating element, with the pump so disposed relative to the level of fat in the frying vat as to insure lubrication of a single lower pump rod bearing by the cooking fat.

A further and important object of the invention is to provide a deep fat food fryer of the foregoing character wherein the fryer includes a vat, a fat-heating element and an electric motor operated pump for drawing fat from the vat and delivering the same to the heating element, there being a gas heater for the fat-heating element, and a cooperating control valve for the gas heater and switch for the electric motor so related as to effect closing of the switch for placing the motor in operation prior to the opening movement of the control valve for the gas heater to ensure the circulation of fat through the machine and eliminating overheating or burning of the fat in the fat-heating element.

It is also an object of the invention to provide a plurality of insulation walls within the casing structure of the deep fat food fryer to confine stack heat to the fat-heating element, the vat and lower end of the pump and to prevent the passage of stack heat to the electric motor for the operation of the pump, there also being vertical air shafts in the casing structure laterally of the combustion chamber housing a heater for the fat-heating element.

With the above and other objects in view that will become apparent as the nature of the invention is better understood, the same consists in general of certain novel details of construction and combination of parts hereinafter more fully described, illustrated in the accompanying drawings and claimed.

Figure 2:
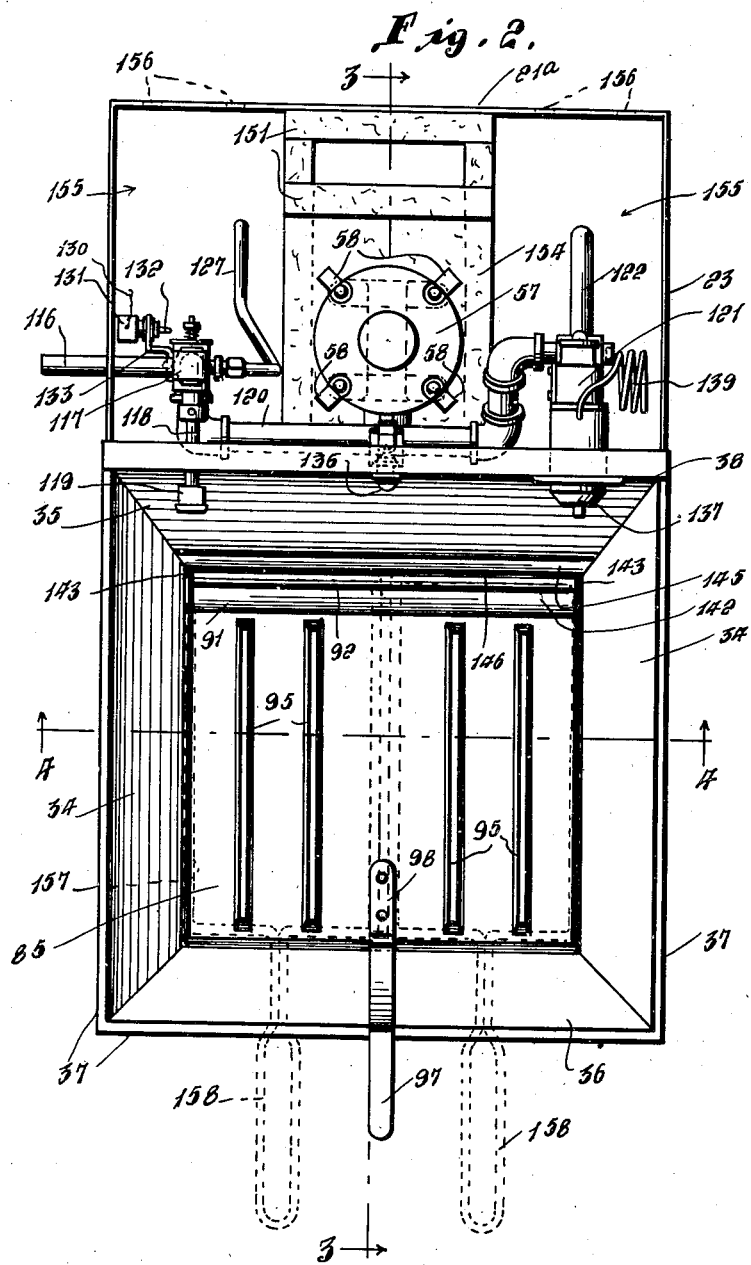
Figure 3:
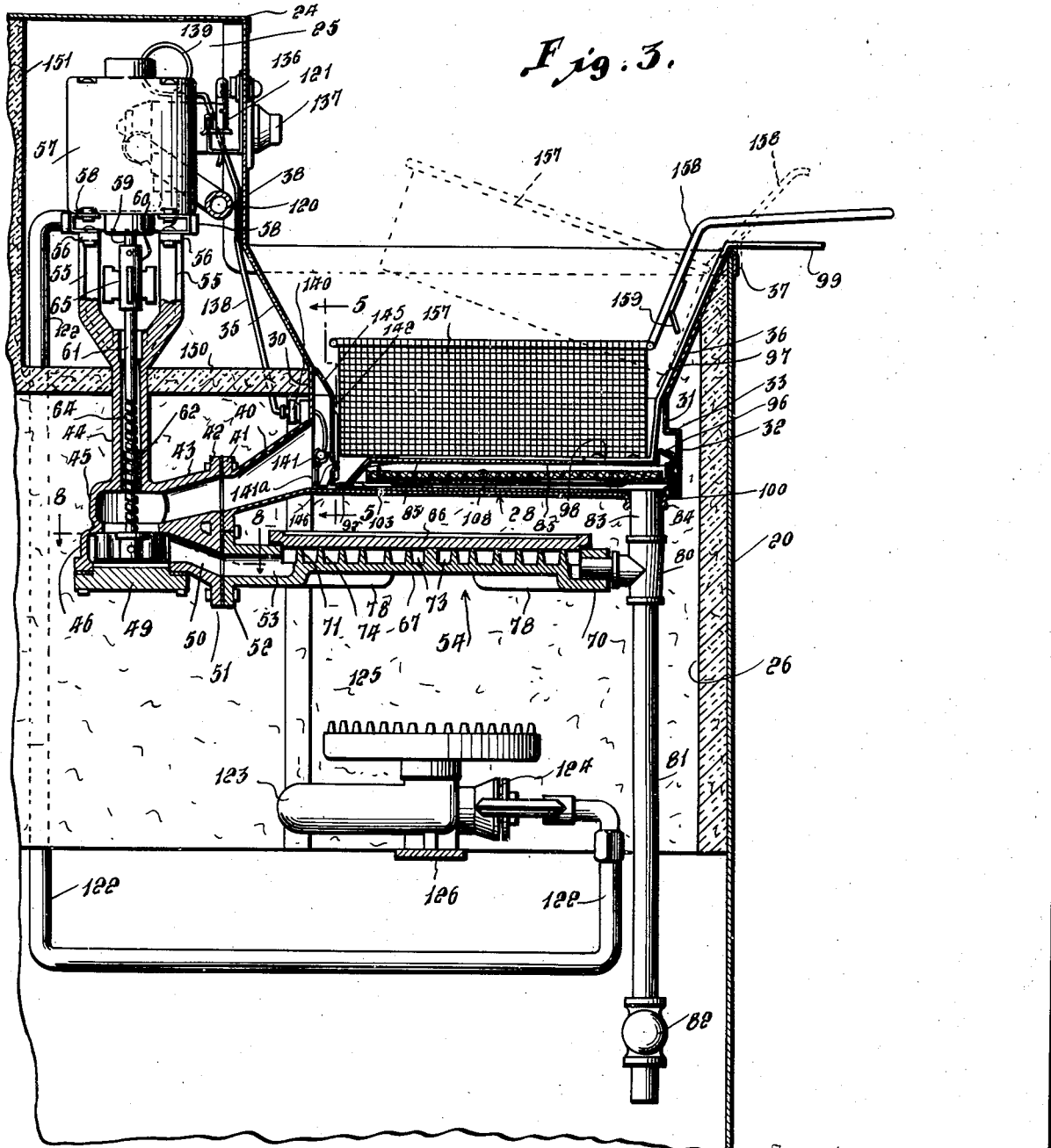
Figure 14:
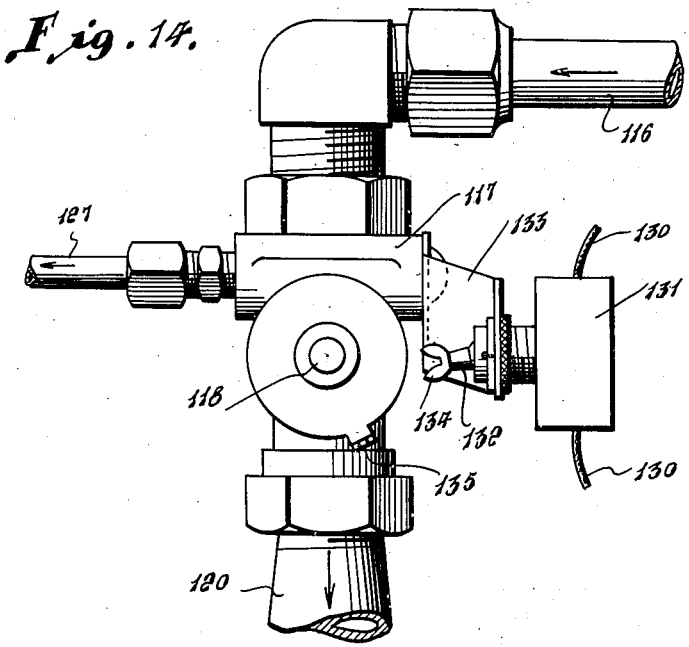
Figure 15:
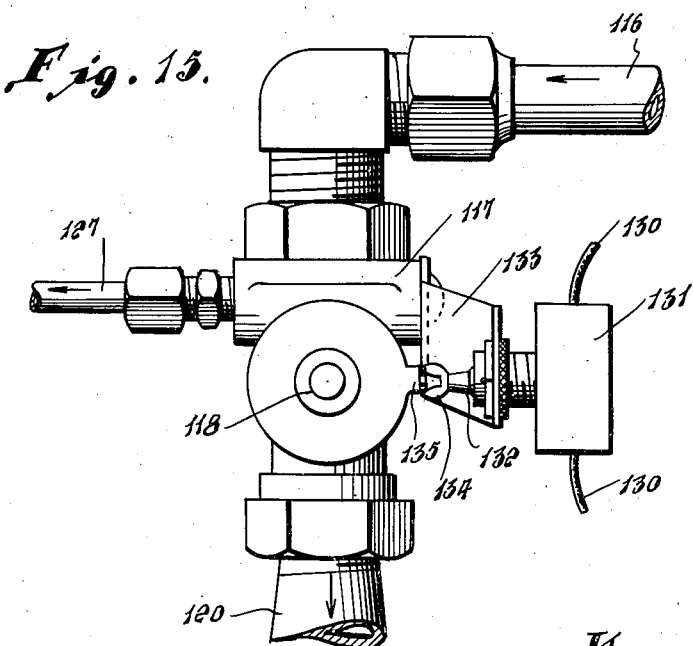

In the drawings:

Figure 1 is a vertical cross-sectional view of the cabinet structure of the deep fat food fryer with the devices within the cabinet structure shown in elevation, Figure 2 is a top plan view with the cover of the casing removed to illustrate the electric motor for the operation of the fat circulating pump, the thermostatically operated valve for the gas heater and the coacting switch for the electric motor and main gas valve, a pair of food holding frying baskets being illustrated by dotted lines, Figure 3 is a vertical cross-sectional view taken on line 3—3 of Figure 2, one of the baskets in the frying vat being illustrated by dotted lines in its fat draining position, the motor operated pump for drawing fat from the vat and delivering the same to a fat-heating element and a heater for the fat-heating element, Figure 4 is a vertical cross-sectional view taken on line 4—4 of Figure 2, showing a rear panel wall of the casing structure disposed rearwardly and upwardly of the frying vat and carrying the operating handle for the gas valve and electric switch, the pilot lamp and the control for the thermostat, the pilot light for the gas burner being located within the combustion chamber and in proximity of the fat-heating element and vat to constantly maintain a sufficiently high temperature in the fat to prevent congealing thereof, Figure 5 is a fragmentary vertical sectional view taken on line 5—5 of Figure 3, showing a removable baffle at the rear side of the frying vat with the heat responsive element of the thermostat shown by dotted lines and positioned rearwardly of the baffle for protection thereby, Figure 6 is a horizontal sectional view taken on line 6—6 of Figure 5, Figure 7 is a vertical detail sectional view taken on line 7—7 of Figure 5, showing the spring clips carried by the rear wall of the vat rearwardly of the baffle therein for the support of the heat responsive element of the thermostat, Figure 8 is a detail horizontal sectional view taken on line 8—8 of Figure 3 showing the pump for effecting circulation of the fat, Figure 9 is a vertical longitudinal sectional view of the combination filter and hot fat distributor that is removably mounted upon the bottom wall of the frying vat, the filter being removably supported in the distributor, Figure 10 is a vertical cross-sectional view taken on line 10—10 of Figure 9, showing the openings at one end of the distributor for effecting even distribution of the fat of highest temperature over the bottom of the vat, Figure 11 is a fragmentary longitudinal sectional view taken on line 11—11 of Figure 9 showing one design or form of filter plate within the distributor, Figure 12 is a top plan view of the lower section of the fat-heating element showing the tortuous passage therethrough indicated by arrow lines for the flow of fat while being heated, the walls of the tortuous passage having abutment shoulders for contacting and breaking down any entrained water globules carried by the fat in its flow through the heating element, Figure 13 is a bottom plan view of the bottom face of the lower section of the fat heating element showing radial fins to effect rapid conduction of heat to the fat flowing through the element, Figure 14 is a fragmentary elevational view of the gas connection including the gas pipe to the pilot light, the gas pipe to the main gas burner and the handle for the gas valve disposed in proximity of the switch element controlling operation of the electric motor that drives the fat circulating pump, this figure showing the control valve for the main gas line and the electric switch in their on positions, Figure 15 is a fragmentary elevational view similar to Figure 14 showing the main gas valve and switch for the electric motor in their off positions, the gas valve having been first moved to shut off the supply of gas prior to the opening movement of the electric switch and vice versa, Figure 16 is a top plan view of the bottom member of another form of fat-heating element showing staggered parallel ribs effecting a tortuous flow of fat therethrough, Figure 17 is a fragmentary top plan view of another form of fat filter embodying a plurality of angle strips, and Figure 18 is a longitudinal sectional view taken on line 18—18 of Figure 17.

In the accompanying drawings, the deep fat food fryer is illustrated, as shown more clearly in Figures 1 to 4, as being of a cabinet type of generally rectangular formation and more specifically a casing comprising front and rear walls 20 and 21, side walls 22, the side walls adjacent their rear edges carrying upwardly directed extensions 23, while the rear wall 21 carries an upwardly directed extension 21ª, said extensions terminating in the same plane and receiving a cover plate 24 providing a chamber 25. The inner faces of said walls and their extensions are lined with heat insulating sheets 26 that extend from the upper ends downwardly a distance slightly below a gas burner element within the casing for the insulation of the walls of the casing and for confining the heat from the gas burner within an area defined as a combustion chamber 27.

A frying vat of generally rectangular formation is mounted upon the upper edges of the front wall 20 and side walls 22 at the forward side of the casing relative to the wall extensions 23 and 21ª and comprises a bottom wall 28 carrying relatively short perpendicular side walls 29, a rear wall 30, and a front wall 31, the latter carrying a longitudinally extending offset wall portion 32 defining an upper horizontal shoulder 33. Upwardly and outwardly flaring side walls 34 are carried by the upper edges of the perpendicular side walls 29 while upwardly flaring rear and front walls 35 and 36 are carried by the relatively short perpendicular rear and front walls 30 and 31. Depending flanges 37 are carried by the upwardly flaring walls 34 and 36 for interengaging support upon the upper edges of the front wall 20 and the side walls 22 of the casing. The upper edge of the upwardly flaring rear wall section 35 carries a perpendicular wall section 38 that will be hereinafter referred to as a panel wall and providing a closure for the front side of the chamber 25. The form of vat disclosed is of such character as to render it readily accessible for cleaning as well as permitting a relatively large frying capacity with a minimum quantity of fat, the angle bend between the lower perpendicular walls of the vat and the upwardly flaring wall sections thereof aiding in determining the amount of fat in the vat, while said upwardly flaring walls provide an increased area to prevent overfoaming of the fat and to confine the spattering thereof.

In the operation of the deep fat food fryer, the fat in the vat flows in a circuitous path outwardly of the rear wall section 30 to a pump that is driven by an electric motor and from the pump the fat is delivered to a fat-heating element below and in proximity of the bottom wall 28 of the vat and from said fat-heating element the fat in its circuitous flow is delivered to a removable fat distributor and filter mounted in the bottom of the vat. The rear wall section 30 of the vat has an opening therein of substantially triangular formation as indicated by the reference character 39 in Figure 5 and welded or otherwise secured to the wall of said opening 39 is a substantially triangular pipe section 40 that is downwardly directed as shown in Figure 3, the apices of the opening 39 and pipe section 40 being directed upwardly. The lower end of the pipe section 40 is flanged as at 41 for abutting engagement with a flange 42 carried by a pipe section 43 projecting laterally of a vertically disposed pump housing 44, the abutting flanges 41 and 42 having a sealing gasket therebetween and being liquid-tight bolted together. The pipe section 43 of the pump housing 44 communicates with a chamber 45 adjacent the lower end of the pump housing and said chamber 45 is in open communication at its lower side with a pump impeller chamber 46 at the lower terminal end of the pump housing and which chamber 46 carries a flanged plate 47 having openings 48 therein for bolting engagement with a bottom closure plate 49 with a liquid-tight sealing gasket between the flanged plate 47 and closure plate 49. The impeller chamber 46 of the pump housing 44 has an outlet pipe 50 flanged at its free end as at 51 for abutting and bolting engagement with the flange 52 carried by the inlet pipe 53 of a fat-heating element designated in general by the reference character 54.

The pump housing 44 comprises a cylindrical tubular member extending upwardly from the upper chamber 45 of the pump, the upper end of the tubular member of the pump being forked to provide a pair of upwardly directed arms 55 with a cross-head 56 at the upper end of each fork arm 55 upon which an electric motor 57 is mounted by means of U-shaped springs 58 operative to prevent the conduction of heat from the pump to the motor and to reduce vibration of the motor during operation thereof. The motor shaft 59 has a coupling connection 60 with a pump shaft 61, the diameter of the pump shaft 61 being slightly less than the bore through the cylindrical tubular member of the pump housing as shown in Figure 3 and having a single bearing support 62 adjacent the lower end of the cylindrical tubular member of the pump. The pump shaft 61 extends downwardly through the upper chamber 45 and enters the lower chamber 46, a bladed impeller wheel 63 being fixed to the lower end of the pump shaft 61 and operative for drawing the fat out of the frying vat and delivering the same to the fat-heating element 54. The lower end of the pump shaft 61 is spirally grooved as at 64 for purposes to be later described. The coupling connection 60 between the motor shaft 59 and pump shaft 61 carries a bladed fan wheel 65 that is operative for carrying heat away from the motor 57.

The fat heating element is shown more clearly in Figures 3, 4, 12 and 13 as comprising top and bottom plates 66 and 67, the top and bottom plates carrying outwardly directed apertured peripheral lugs 68 for the passage of screw bolts 69 for securing the two sections together, a liquid-tight sealing gasket being interposed between the marginal edges of said sections. The bottom section of the fat-heating element 54 as shown in Figures 12 and 13 includes the inlet pipe 53 and the diametrically opposite outlet pipe 70. The upper face of the bottom section 67 of the fat heating element is of chamber formation and has extending from the inlet pipe 53 an upstanding rib 71 of coiled formation with the end 72 of the rib 71 terminating in proximity of the axis of said bottom section and in a central chamber 73. A second upstanding rib 74 of coiled formation has the inner terminal end 75 thereof within the chamber 73, the rib 74 having its spirals following the spirals of the rib 71 in spaced relation thereto and terminating at the outlet pipe 70, the ribs 71 and 74 cooperating to provide a spiral fat flow channel 76 communicating at its outer end with the inlet pipe 53 while the center of said channel communicates with the center chamber 73, the ribs also providing a second channel 77 that leads from the center chamber 73 to the outlet pipe 70. The fat therefore flows in a spiral path from the peripheral edge to the center of the fat-heating element and through a second spiral path from the center of the fat heating element to the peripheral edge of the fat-heating element diametrically opposite the inlet. The top plate 66 of the fat-heating element engages the upper edges of the ribs 71 and 74 to restrict the flow of fat through the channels 76 and 77 as described. The bottom face of the bottom plate 67 of the fat-heating element as shown in Figure 13 carries depending radial ribs 78 to aid in the conduction of heat to the coiled or spiral ribs 71 and 74 for the more rapid heating of the fat flowing through the fat-heating element. It will also be observed from an inspection of Figure 12 that the ribs 71 and 74 have offset portions 79 providing abutment shoulders that are operative for vaporizing into steam any entrained water globules flowing with the fat and which function will be later described in detail.

It is to be understood that the construction of the fat-heating element shown in Figure 12 is the preferred form and that other arrangements may be provided to cause the fat to flow in a tortuous or serpentine path through the fat-heating element and also to reduce to steam any entrained water globules carried with the fat. As an example of a modification of the bottom plate member 67 shown in Figure 12, the form of bottom plate 67$^a$ shown in Figure 16 may be employed, the inlet pipe 53$^a$ communicating with the interior of the fat-heating element while the outlet pipe 70$^a$ returns the fat to the frying vat. The top face of the bottom plate 67$^a$ is of channel formation and has parallel upstanding ribs 71$^a$ rising from the upper face and extending from one side of the plate 67$^a$ with the ends 72$^a$ terminating in spaced relation to the opposite side of the plate. Corresponding ribs 74$^a$ rise from the top face of the plate 67$^a$ and have corresponding ends connected to one side of the plate with the other ends 75$^a$ thereof terminating in spaced relation to the opposite side of the plate 67$^a$. The staggered arrangement of ribs 71$^a$ and 74$^a$ provides a tortuous path 76$^a$ between the ribs that extend from the inlet pipe 53$^a$ to the outlet pipe 70$^a$. The flow of fat through the tortuous path 76$^a$ when flowing around the ends of the ribs that are spaced from the plate has the fat agitated and in the presence of heat any remaining entrained water globules will be broken down and converted into steam.

As shown in Figures 1 and 3, the outlet pipe 70 of the fat-heating element 54 communicates with the horizontally disposed leg of T-fitting 80, the lower end of the cross head of the T-fitting communicating with a system drain pipe 81 carrying a control valve 82 adjacent its lower end while the upper end of the cross head of the T-fitting 80 has a pipe connection 83 with the flanged opening 84 in the bottom wall 28 of the vat adjacent the offset wall portion 32 in the front wall section 31 of the vat.

In the frying of foods such as potatoes of "French fried character" in deep fat, fish, breaded cutlets and the like, crumbs falling from the food are taken up by the fat and the normal sweet flavor of the fat is lost, the invention providing a combined fat filter and fat distributor that is removably mounted upon the bottom wall 28 of the vat to facilitate cleaning thereof whenever desired. The combined fat filter and distributor is shown more clearly in Figures 2, 3, 4 and 9 to 11 as being of rectangular formation in plan view to completely cover the bottom 28 of the vat and being of relatively flat formation comprising top and bottom walls 85 and 86, side walls 87 with inwardly extending longitudinal ribs 88. The forward inclined ends of the side walls 87 are inclined downwardly as at 89, the top wall 85 being spaced slightly below the upper edges of the side walls 87 and carrying upwardly directed side flanges 90 that are welded or otherwise secured to the inner faces of the side walls. The forward end of the top wall 85 is inclined downwardly as at 91 parallel with and spaced slightly rearwardly of the downwardly inclined forward ends 89 of the side walls 87, the lower edge 92 of the downwardly inclined forward end 91 of the top wall being welded to the forward edge of the top surface of the bottom wall 86 of the combined filter and distributor. The rear edge of the top wall 85 carries an upstanding transversely extending flange 93 that is provided with a series of spaced fat distributing openings 94 operable in a manner to be presently described, while said top wall 85 carries spaced longitudinally extending upstanding fat flow guide ribs 95. A tapering flange 96 is carried by the inner ends of the top, bottom and side walls providing an open end. The structure of the combined filter and distributor described provides a fat distributor per se of relatively flat chambered formation open at one end in which the fat filter per se is removably slidable. A lifting handle 97 of angular formation has a foot 98 secured centrally of the inner end of the top wall, the handle 97 being of a length to provide a hand-grip 99 extending over the front tapered wall 36 of the vat to facilitate manipulation thereof as shown in Figure 3. The combined filter and distributor is adapted to be placed into communication with the upper end of the fat flow pipe 83 by means of the circular flange 100 surrounding an opening formed in the bottom wall 86 at the inner end thereof midway the sides of said wall.

The filter per se is slidably mounted into the fat distributor per se through the open end of the latter and comprises a flat bottom wall 101 carrying upstanding side flanges 102 engageable with the inwardly directed ribs 88 on the side walls 87 of the fat distributor for guiding the fat filter in its sliding movements within the distributor, the bottom wall 101 of the filter having secured to the underside of the forward end thereof a forwardly projecting foot or rod 103 for engagement with the bottom wall 86 of the distributor to space the wall 101 above the wall 86 as shown in Figures 9 and 10. The inner end of the bottom wall 101 of the filter is transversely upset as at 104 while the inner edge of the upset bottom wall portion 104 carries a perpendicular flange 105 that is welded or otherwise secured to a transversely extending inner end wall 106 of rectangular formation that carries at its marginal edge an inclined flange 107 for overlapping engagement with the tapering flanges 96 upon the inner ends of the top, bottom and side walls of the fat distributor as will be clearly understood from an inspection of Figure 9. The preferred form of fat filter includes a screen-like grid plate 108 bound at opposite side edges thereof by the channel bead 109 and is adapted for seating engagement upon the bottom wall 101 of the filter plate, lugs 110 being struck-up from the forward edge of the plate 101 for engagement with the forward edge of the grid plate 108 to hold the same in position. The forward edge of the grid plate 108 directly rests upon the bottom wall 101 while the inner edge of the grid plate rests upon the upset bottom wall portion 104 to provide a sediment collection area on the upper surface of the plate 101 as clearly shown in Figure 9. When the inner end wall 106 of the filter per se is engaged with the tapering flanges 96 of the fat distributor, the inner end of the plate 101 of the filter is supported above the bottom wall 86 of the distributor so that a fat flow circuit through the combined filter and distributor as afforded by the passage 111 between the walls 101 and 86 that communicates with a passage 112 between the top wall 85 of the distributor and the bottom wall 101 of the filter with the passage 112 leading to the distributor openings 94, the direction of fat flow being indicated by arrow lines in several of the views and particularly in Figure 9.

To facilitate placement and removal of the slidably positioned filter per se into the chamber of the distributor, the inner end wall 106 of the filter carries a loop strap 113 that may be engaged by the angle end of a strap handle when the combined filter and distributor is removed from the vat. While the screen grid type of filter device 108 shown in Figures 9 to 11 is the preferred design, it is to be understood that other types of crumb and sediment collecting grids may be employed, an example of a modification being shown in Figures 17 and 18 wherein the bottom plate 101 of the filter per se carries the forwardly extending feet 103, the inner end wall 106 with its flange 107 and its upset wall portion 104. The filter grid comprises a bottom plate 114 having transversely extending angle strips 115 for the collection of crumbs and other sediment in the fat flowing thereover through the chamber 112 in the distributor.

A gas burner is arranged within the casing structure below and in proximity of the fat-heating element 54 and the control valve for the gas supply to the burner is arranged in the chamber 25 in the upper extension of the casing structure rearwardly of the front panel wall 38 and said gas control valve has communication with a thermostat element supported on the rear face of the panel wall 38 within the chamber 25. A gas pipe 116 from a source of supply extends into the chamber 25 of the casing structure and communicates with the gas valve 117 that is controlled in its operation by the valve rod 118 horizontally extending through the panel wall 38 and carrying on the front side of the panel wall an operating handle 119. A gas pipe 120 supported on the rear face of the panel wall 38 extends from the gas valve 117 to a thermostatically-operated valve 121. A gas pipe 122 extends downwardly from the thermostatically-operated valve 121 to a gas burner pipe 123 for attachment thereto by a coupling including an air control inlet 124. A burner 125 is carried by the burner pipe 123 and the burner pipe and burner are mounted upon a support 126 within the casing structure. The burner 125 is positioned directly beneath and in proximity of the fat-heating element 54 as clearly illustrated in Figures 1, 3 and 4. A pilot light pipe 127 communicates at one end with the gas control valve 117, the other end thereof being mounted in the support 126 and having a control valve 128 and a pilot burner 129 in proximity of the gas burner 125.

A source of electrical energy is in communication with the electric motor 57 and the flow thereof over the wires 130 to the switch box 131 is controlled by the switch arm 132, the switch box 131 being supported by means of the bracket 133 upon the valve casing 117 as shown in Figures 14 and 15. It is essential in the successful operation of the machine and to prevent burning of the fat to operate the switch arm 132 for supplying electrical energy to the motor 57 to operate the pump for the circulation of fat prior to the lighting of the gas burner 125 and as shown in Figures 14 and 15 the switch arm 132 has a forked head 134 that is adapted to be engaged by a lug 135 carried by the gas control valve stem 118. When the gas control valve 117 is in its closed position and the switch arm 132 is in its off position to shut off the supply of current to the motor 57, the lug 135 upon the valve rod 118 and the switch arm 132 are in the positions shown in Figure 15. Upon initial operation of the valve rod 118 by the handle 119, the lug 135 first throws the switch arm 132 to on position for starting the electric motor 57 and the fat circulating pump, continued movement of the valve rod 118 opening the gas control valve 117 for the supply of gas to the burner 125, the coacting elements then assuming the positions shown in Figure 14. The switch arm 132 also controls the supply of energy to a signal lamp 136 set into the panel wall 38.

A thermostatically-operated valve 31 through which the gas flows to the gas burner 125 includes a control knob 137 set into the panel wall 38 and is suitably graduated to be set for regulating the operation of the valve 121 by a heat responsive element located in the vat and in communication therewith. The thermostatically-operated valve 121 has for the heat responsive actuating element thereof a pipe containing an expansible fluid, the pipe 138 as shown in Figures 1 and 3 including a coiled section 139 located in the chamber 25 and connected with the valve 121, the other end of the pipe 138 being attached to a fitting 140 set into the rear wall 30 of the vat and a pipe section 138ᵃ extending downwardly in proximity of the rear wall 30 of the vat for attachment to a heat responsive tubular element 141 disposed horizontally in the vat and supported by spring clips 141ᵃ carried by the rear wall 30 of the vat as clearly shown in Figures 5 to 7. It will be observed that the heat responsive tubular element 141 extends across the outlet opening 39 for the flow of fat from the vat.

To protect the pipe section 138 and the heat responsive tubular element 141, there is provided a vertical baffle wall 142 removably mounted in the vat in proximity of the rear wall 30 thereof and in overlying relation to said pipe section 138 and heat responsive tubular element 141, the baffle wall 142 extending completely across the vat and being guided in its sliding movements by inwardly directed beads 143 formed on the side wall sections 29 of the vat as shown in Figures 5 and 7, the ends of the baffle wall carrying angularly directed flanges 144 abutting the rear wall 30 of the vat, while the upper end of the baffle carries a flanged wall section 145 directed toward and engaged with the upper edge of the rear wall section 30 as shown in Figure 7. The baffle 142 is provided with a longitudinally extending reinforcing bead 146 adjacent the lower end thereof while the lower edge of the baffle plate is serrated or notched to provide spaced openings 147 for the flow of fat below the lower edge of the baffle and into the chamber 148 defined by the baffle and rear wall 30. To promote instant action of the heat responsive tubular member 141, the baffle plate 142 is provided with a longitudinal series of spaced openings 149 horizontally alined with said member 141.

To protect the motor 57 from heat within the casing structure and to confine the heat by providing a combustion chamber housing the burner 125, the fat-heating element 54, the vat and the lower end of the pump housing 44, such chamber being defined by the reference character 27, there is provided a series of insulation walls, one wall 150 being horizontally disposed as shown more clearly in Figures 1 and 3 as extending from the rear wall 30 of the vat and through which insulation wall 150, the tubular portion of the pump housing 44 extends, a vertical insulation wall 151 rising from the rear end of the horizontal wall section 150 to the cover plate 24 in spaced relation to the heat insulating sheet 26 carried by the rear wall 21 of the casing structure, such spacing providing a rear stack 152 insulated from the motor 57 and upper end of the pump with an outlet for the stack 152 through the rear wall extension 21ᵃ as at 153. Vertical insulation walls 154 rise from the horizontal insulation wall 150 at opposite sides of the motor 57 and extend to the cover plate 24 and provide lateral air shafts 155 that outlet through the rear wall extension 21ᵃ at the points 156.

A screen frying basket indicated by the reference character 157 is shown in Figures 3 and 4 as being supported within the vat on the guide ribs 95 rising from the top wall 85 of the combined distributor and filter, the basket having an angular handle 158 normally extending over the upper end of the front wall 20 of the casing structure and carrying an angle arm 159 to be supported upon the upper forward edge of the vat as shown by dotted lines in Figure 3 for the draining of fat from the basket 157. Two baskets are illustrated as supported within the vat in Figure 4, but it is to be understood that one basket may be of such size as to completely occupy the frying area within the vat or any number of baskets of appropriate sizes may be used.

The pilot burner 129 illustrated in the combustion chamber 27 in proximity of the gas burner 25 under control of the hand-operated valve 128 constantly burns and provides sufficient heat in the combustion chamber that houses the vat, the fat-heating element 54 and the lower chambers 45 and 46 of the pump 44 and is operative to maintain sufficient heat in the combustion chamber to keep the fat in a fluent state against congealing or solidification during idle periods of the machine between the cooking of foods. To place the machine in operation, the control knob 137 for the thermostatically-operated valve 121 is then manually set to the degree of temperature at which it is desired to raise and maintain the frying fat. The operating handle 119 for the gas control valve 117 is then opened and during the opening movement thereof from the off position shown in Figure 15, the lug 135 carried by the stem 118 of the gas control valve first operates the switch arm 132 to close the circuit from the source of electrical energy to the electric motor 57 and the pilot lamp 136 showing that the machine is in operation. Continued movement of the operating handle 119 then opens the gas valve 117 to permit the flow of gas therethrough from the supply line 116 through the pipe 120 and through the thermostatic valve 121 and pipe 122 to the burner pipe 123 and gas burner 125. When the fat is raised to the desired frying temperature the heat responsive element 141 in the chamber 148 between the baffle 142 and rear wall 30 of the vat operates the thermostatically-operated valve 121 to cut off the supply of gas to the burner 125 and the gas remains cut off until the temperature of the fat lowers to permit activity of the thermostatically-operated element 141.

In the operation of the deep fat food fryer, the pump draws the fat from the vat and delivers the same to the fat-heating element 54 for the heating of the fat to the desired frying temperature and return by way of the combined filter and distributor to the vat for passage through the vat in contact with the food in the baskets 157. In the flow of fat in its circuitous path, the baffle 142 acts as a protector for the heat responsive element 141 of the thermostat and by the provision of the openings 149 in the baffle rapid circulation of the fat is permitted in direct contact with the heat responsive element for more prompt and efficient operation thereof in maintaining the fat at the desired degree of frying temperature. The openings 147 at the lower edge of the baffle also permit the flow of fat into the chamber 148 for discharge through the wall opening 39 and pipe 40 leading to the pump. Entrained water globules flowing with the fat are broken down when contacting the baffle and the conversion thereof into steam permits escape of the steam to the atmosphere. Sediment flowing in the fat in the nature of crumbs and the like falling from the food flows to the pump by gravitation and initially into the upper chamber 45 of the pump, agitation of flow of the fat further breaking down entrained water globules and permitting the backward escape of steam through the upwardly inclined pipe 40 at the apex end thereof for escape to the atmosphere through the vat and thereby preventing the pump from becoming steam bound and unprimed. Any remaining entrained globules of water flow with the fat and sediment under pressure of the bladed pump wheel 63 into the fat-heating element 54 to take the circuitous flow therethrough as described in connection with Figures 12 and 16. Further separation of entrained water globules in the fat-heating element is accomplished by the abutment shoulders 79 of the ribs 71 and 74 in Figure 12 and the free end of the ribs 71ª and 74ª in Figure 16, the steam from said globules then flowing separately with the fat and sediment, with the fat raised to the desired temperature in the heating element for return to the vat by way of the T-connection 80, some of the sediment being precipitated downwardly into the drain pipe 81. The hot fat, steam and sediment travel upwardly through the pipe section 83 and enter the opening in the bottom wall 86 of the combined fat filter and distributor to travel a course indicated by the arrow lines in Figure 9. The fat travels first through the space 111 between the bottom wall 86 of the distributor and the bottom wall 101 of the filter, traveling forwardly and then rearwardly to enter the chamber 112 between the top wall 85 of the distributor and the bottom wall 101 of the filter. Sediment carried with the fat precipitates upon the screen grid 108 and collects therein, the clean fat in its heated condition then flowing out of the chamber 112 evenly through the distributing openings 94 onto the bottom wall of the vat and through the food containing baskets 157, completing one cycle and continuing in a second cycle by passage through the openings in the baffle 142. The pump rod 61 has a single bearing in the tubular portion of the pump housing 44 adjacent the lower end of the latter and below the level of the fat in the vat so that when the machine is idle, the fat rises up the pump rod 61 and provides lubrication for the bearing 62 of said rod. The spiral groove 64 in the pump rod 61 acts to force the fat downwardly and thereby renders a packing gland unnecessary, the groove permitting the level of fat to rise above the bearing when the pump is at rest. When the pump is started, the fat above the bearing is flushed out by the spiral groove in the pump rod and changes the fat above the bearing each time the pump is placed in operation. As the cooler fat leaves the vat, it enters the pump which forces it through the channels of the fat-heating element and as the fat travels through the pump and heating element it picks up the heat units that are applied to the outside surfaces of the pump and heating element. The hot fumes or stack losses that pass under the bottom of the vat supply additional units to the fat through the bottom of the vat.

The openings 94 in the fat distributor are so arranged that the fat is forced therethrough in a manner to be evenly distributed throughout the cooking area within the vat. As the pump 57 operates at high temperature, there is a tendency of the heat to travel up the pump rod which is directly connected to the motor but such heat is rapidly dissipated by the fan wheel 65 carried by the coupling 60 between the motor shaft 59 and the pump shaft 61 and said fan wheel 65 is operative for lowering the temperature within the chamber 25 that houses the motor, the gas valve and the thermostatically-operated valve.

In describing the operation of the machine, it has been said that the fat carrying the sediment flows through the pump, the fat heating element 54, and is then returned to the combined fat filter and distributor. The baffle 142 disposed in the vat is arranged in the path of fat flow. The openings 149 in the baffle wall 142 are of such size as to prevent the flow of large particles of food with the fat and which large particles of food would have a tendency to clog the fat circulating pump and impede operation thereof. The large particles of food moving with the flowing fat through the vat forcefully contact the baffle wall 142 and are broken down into relatively small particles and these smaller particles are permitted to flow with the fat through the wall openings 149 for free circulation through the fat circulating pump without any tendency to clog the latter. In other words, the baffle wall 142 in addition to having the spaced openings 149 therein so disposed as to cause the flowing fat to immediately contact the heat responsive element 141 is also operative for breaking down the larger particles of food into smaller particles for free circulation with the fat through the pump.

From the above detailed description of the invention, it is believed that the construction and operation thereof will at once be apparent, and while there are herein shown and described the preferred embodiments thereof, it is to be understood that minor changes may be made in the details of construction, such as will fall within the scope of the invention as claimed.

I claim:

1. In a deep fat food fryer, a casing of cabinet formation having an upwardly directed extension at the rear thereof providing a front panel wall rearwardly of the top part of the front side of the casing, a frying vat in the top of the front part of the casing below the panel wall, a fat-heating element below the vat, a gas burner below the fat-heating element, a pump connecting the vat to the fat-heating element positioned laterally thereof, a return pipe connection between the heating element and vat, a coacting gas control valve and a thermostatically-operated gas valve in the casing extension, an electric motor in the casing extension for the operation of said pump and insulation partition walls in the casing separating the extension from the lower part of the casing and forming a combustion chamber housing the vat, pump, fat-heating element and burner.

2. A deep fat food fryer as set forth in claim 1, wherein a switch is provided for the electric motor and an operating handle is provided for the gas control valve and means carried by the gas control valve adapted to operate the motor switch to close the same for operating the motor during initial opening movement of the gas control valve.

3. In a deep fat food fryer, a frying vat, a fat-heating element below the vat, a gas heater below the fat-heating element, a motor operated pump forming communication between the vat and heating element and positioned below the level of fat in the vat for the gravitational flow of fat and sediment to the pump, a return pipe connection between the heating element and vat, and a combined fat distributor and filter removably mounted on the bottom fall of the vat to intercept the return flow of fat to the vat to collect sediment from the fat and distribute the fat over the lower area of the vat.

4. A deep fat food fryer as set forth in claim 3, wherein the combined fat distributor and filter includes a relatively flat receptacle having fat distributing openings at one side thereof for directing the flow of fat over the top wall of the receptacle and a filter element removably mounted in the receptacle and forming a tortuous passage through the receptacle with flow retarding and collection means for the sediment in the fat.

5. A deep fat food fryer as set forth in claim 3, wherein the combined fat distributor and filter includes a relatively flat receptacle having fat distributing openings at one side thereof for directing the flow of fat over the top wall of the receptacle and a filter element removably mounted in the receptacle and forming a tortuous passage through the receptacle, the filter element comprising a bottom plate having an end wall forming a closure for the distributor receptacle and a screen grid removably mounted on the bottom wall for the precipitous reception of sediment in the fat.

6. A deep fat food fryer as set forth in claim 3, wherein the combined fat distributor and filter includes a relatively flat receptacle having fat distributing openings at one side thereof for directing the flow of fat over the top wall of the receptacle and a filter element removably mounted in the receptacle and forming a tortuous passage through the receptacle, the filter element comprising a bottom plate having an end wall forming a closure for the distributor receptacle and a plate carrying adjacently positioned angular abutment ribs removably mounted on the bottom wall for the precipitous reception of sediment in the fat.

7. A deep fat food fryer as set forth in claim 3, wherein the combined fat distributor and filter includes a relatively flat receptacle having fat distributing openings at one side thereof for directing the flow of fat over the top wall of the receptacle and a filter element removably mounted in the receptacle and forming a tortuous passage through the receptacle with flow retarding and collection means for the sediment in the fat and upstanding spaced ribs carried by the top wall of said receptacle for spacing a food basket from said top wall for the free circulation of fat over the top wall and through the basket.

8. A deep fat food fryer as set forth in claim 3, wherein the fat-heating element has a tortuous passage therethrough with walls of the passage constructed to effect agitation of the flowing fat to break down entrained water globules in the fat for conversion into steam before return to the vat.

9. A deep fat food fryer as set forth in claim 3, wherein the fat-heating element has its pump and return pipe connections diametrically disposed, and a pair of interrelated spiral ribs forming tortuous passages between said connections and a common chamber centrally of the element whereby fat entering the element from the pump travels in a clockwise spiral path toward the center chamber and sequentially travels in a counter-clockwise spiral path toward the return pipe connection.

10. A deep fat food fryer as set forth in claim 3, wherein the fat-heating element has its pump and return pipe connections diametrically disposed, and a pair of interrelated spiral ribs forming tortuous passages between said connections and a common chamber centrally of the element whereby fat entering the element from the pump travels in a clockwise spiral path toward the center chamber and sequentially travels in a counter-clockwise spiral path toward the return pipe connection, said spiral ribs having spaced fat flow abutments to effect agitation of the flowing fat to break down entrained water globules in the fat for conversion into steam before return to the vat.

11. A deep fat food fryer as set forth in claim 3, wherein the fat-heating element has its pump and return pipe connections diametrically disposed, and two sets of parallel ribs connected at ends to the sides of the fat-heating element and extending across the same between the pump and return pipe connections with alternate ribs of each set spaced from the opposite side of the element to form a tortuous passage between said connections to effect agitation of the flowing fat to break down entrained water globules in the fat for conversion into steam before return to the vat.

12. A deep fat food fryer as set forth in claim 3, wherein the pump has an impeller chamber and a superposed air chamber with the latter in open communication with the vat whereby entrained water globules in the fat are broken down by the pump impeller and converted into steam for escape to the pump air chamber for return to the vat and passage to the atmosphere.

13. A deep fat food fryer as set forth in claim 3, wherein the pump has an impeller chamber and a superposed air chamber with the latter in open communication with the vat and spaced below the level of fat in the vat and a rod for the pump impeller having a spiral groove therein with a single bearing adjacent the lower end thereof with the normal level of fat rising above the bearing whereby the operation of the pump causes the fat to be moved downwardly of the bearing by said spiral groove, with entrained water globules in the fat being broken down by the pump impeller and converted into steam for escape to the pump air chamber for return to the vat and passage to the atmosphere.

14. A deep fat food fryer as set forth in claim 3, wherein the pump includes a pump rod, an electric motor directly connected to the upper end of the pump rod, a control switch for the electric motor, a gas supply line and gas control valve for the gas burner, a thermostatic valve through which the gas flows from the gas control valve to the burner, and means carried by the gas control valve cooperating with the control switch for the motor for operating the control switch to set the motor in operation during initial opening movement of the gas control valve and prior to the feeding of gas therethrough.

15. A deep fat food fryer as set forth in claim 3, wherein the pump includes a pump rod, an electric motor directly connected to the upper end of the pump rod, a control switch for the electric motor, a gas supply line and gas control valve for the gas burner, a thermostatic valve through which the gas flows from the gas control valve to the burner, and means carried by the gas control valve cooperating with the control switch for the motor for operating the control switch to set the motor in operation during initial opening movement of the gas control valve and prior to the feeding of gas therethrough, and a bracket supporting connection between the gas control valve and control switch.

16. A deep fat food fryer as set forth in claim 3, wherein the pump includes a pump rod, an electric motor directly connected to the upper end of the pump rod, a control switch for the electric motor, a gas supply line and gas control valve for the gas burner, a thermostatic valve through which the gas flows from the gas control valve to the burner, means carried by the gas control valve cooperating with the control switch for the motor for operating the control switch to set the motor in operation during initial opening movement of the gas control valve and prior to the feeding of gas therethrough, and a fan wheel on the pump rod adjacent the motor to dissipate heat rising up the pump rod.

17. A deep fat food fryer as set forth in claim 3, wherein a gas supply line and gas control valve is associated with the gas burner, a thermostatic valve through which the gas flows from the gas control valve to the burner, the thermostatic valve including a heat responsive element in the vat in the path of flow of the fat through the vat and a baffle plate in the vat overlying the heat responsive element.

18. A deep fat food fryer as set forth in claim 3, wherein a gas supply line and gas control valve is associated with the gas burner, a thermostatic valve through which the gas flows from the gas control valve to the burner, the thermostatic valve including a heat responsive element in the vat in the path of flow of the fat through the vat and a baffle plate in the vat overlying the heat responsive element, the heat responsive element extending across the fat outlet of the vat and a support for the heat responsive element carried by a wall of the vat.

19. A deep fat food fryer as set forth in claim 3, wherein a gas supply line and gas control valve is associated with the gas burner, a thermostatic valve through which the gas flows from the gas control valve to the burner, the thermostatic valve including a heat responsive element in the vat in the path of flow of the fat through the vat and a baffle plate in the vat overlying the heat responsive element, the baffle being removably mounted in the vat and including a wall having a notched lower end for the passage of fat to the outlet of the vat and a series of openings alined with the heat responsive element to provide efficient operation of the thermostatic valve, the large loose food particles being broken down by forceful contact with said baffle, and the openings in the baffle being of such size whereby only smaller loose particles of food will pass therethrough with the flowing fat and through the chamber of the pump without clogging the pump.

20. A deep fat food fryer as set forth in claim 3, wherein a gas supply line and gas control valve is associated with the gas burner, a thermostatic valve through which the gas flows from the gas control valve to the burner, the thermostatic valve including a heat responsive element in the vat in the path of flow of the fat through the vat and a baffle plate in the vat overlying the heat responsive element, the heat responsive element extending across the fat outlet of the vat and a support for the heat responsive element carried by a wall of the vat, the baffle being removably mounted in the vat and including a wall having a notched lower end for the passage of fat to the outlet of the vat and a series of openings alined with the heat responsive element to provide efficient operation of the thermostatic valve, the large loose food particles being broken down by forceful contact with said baffle, and the openings in the baffle being of such size whereby only smaller loose particles of food will pass therethrough with the flowing fat and through the chamber of the pump without clogging the pump.

KENNETH P. TOTA.